United States Patent
Okuyama et al.

(10) Patent No.: US 10,839,044 B2
(45) Date of Patent: Nov. 17, 2020

(54) INFORMATION PROCESSING APPARATUS THAT CONTROLS A SEMICONDUCTOR DEVICE THAT CALCULATES AN INTERACTION MODEL AS AN ACCELERATOR

(71) Applicant: Hitachi, Ltd., Tokyo (JP)

(72) Inventors: Takuya Okuyama, Tokyo (JP); Masanao Yamaoka, Tokyo (JP)

(73) Assignee: HITACHI, LTD., Tokyo (JP)

(*) Notice: Subject to any disclaimer, the term of this patent is extended or adjusted under 35 U.S.C. 154(b) by 400 days.

(21) Appl. No.: 15/907,312

(22) Filed: Feb. 28, 2018

(65) Prior Publication Data
US 2018/0349325 A1    Dec. 6, 2018

(30) Foreign Application Priority Data
Jun. 6, 2017 (JP) ................. 2017-111694

(51) Int. Cl.
| | | |
|---|---|---|
| G06F 17/18 | (2006.01) | |
| G06F 7/48 | (2006.01) | |
| G06N 5/00 | (2006.01) | |
| G06N 7/00 | (2006.01) | |
| G06N 3/04 | (2006.01) | |

(Continued)

(52) U.S. Cl.
CPC ........... G06F 17/18 (2013.01); G06F 7/48 (2013.01); G06N 3/0445 (2013.01); G06N 3/0472 (2013.01); G06N 3/063 (2013.01); G06N 5/003 (2013.01); G06N 7/005 (2013.01); *G06F 7/588* (2013.01); *G06F 2207/4802* (2013.01); *G06N 20/10* (2019.01)

(58) Field of Classification Search
None
See application file for complete search history.

(56) References Cited

U.S. PATENT DOCUMENTS

| 2016/0062704 A1* | 3/2016 | Yamaoka | G06N 3/0445 711/104 |
|---|---|---|---|
| 2016/0062951 A1* | 3/2016 | Yoshimura | G11C 19/08 708/190 |

(Continued)

FOREIGN PATENT DOCUMENTS

| JP | 2016-051313 A | 4/2016 |
|---|---|---|
| WO | 2014/192153 A1 | 12/2014 |

OTHER PUBLICATIONS

Shogo Yamanaka, et al., "Detection of Cheating by Decimation Algorithm," Journal of the Physical Society of Japan, vol. 84, No. 2, pp. (024801-1)-(024801-07), 2015.

(Continued)

Primary Examiner — Cedric Johnson
(74) Attorney, Agent, or Firm — Mattingly & Malur, PC

(57) ABSTRACT

Hardware for speeding up MCMC is realized. An information processing apparatus includes a plurality of Ising chips and a controller that controls the plurality of Ising chips. Each of the plurality of Ising chips includes a plurality of units, and each of the plurality of units retains a spin state. The controller instructs one set of Ising chips among the plurality of Ising chips to compare values of spin states of corresponding units and instructs the one set of Ising chip to invert values of a portion of spins among spins having different values of spin states of the corresponding units.

7 Claims, 15 Drawing Sheets

(51) Int. Cl.
*G06N 3/063* (2006.01)
*G06F 7/58* (2006.01)
*G06N 20/10* (2019.01)

(56) References Cited

U.S. PATENT DOCUMENTS

| | | | |
|---|---|---|---|
| 2016/0063148 A1* | 3/2016 | Hayashi | G06F 30/20 |
| | | | 703/2 |
| 2016/0063725 A1 | 3/2016 | Yoshimura | |
| 2016/0064099 A1* | 3/2016 | Yamaoka | G11C 29/08 |
| | | | 365/200 |
| 2016/0118106 A1 | 4/2016 | Yoshimura et al. | |

OTHER PUBLICATIONS

J. Houdayer "A Cluster Monte Carlo Algorithm for 2-Dimensional Spin Glasses," The European Physical Journal B—Condensed Matter and Complex Systems 22.4 (2001): 479-484.

Zhu et al., "Efficient Cluster Algorithm for Spin Glasses in Any Space Dimension," Aug. 18, 2015.

\* cited by examiner (a)  (b)

(a)  (b)

INFORMATION PROCESSING APPARATUS THAT CONTROLS A SEMICONDUCTOR DEVICE THAT CALCULATES AN INTERACTION MODEL AS AN ACCELERATOR

TECHNICAL FIELD

The present invention relates to an information processing apparatus, and particularly, is suitable for application to an information processing apparatus that controls a semiconductor device that calculates an interaction model as an accelerator.

BACKGROUND ART

Various physical phenomena and social phenomena can be represented by an interaction model. The interaction model is a model defined by a plurality of nodes constituting a model, an interaction between the nodes, and if necessary, a bias for each node. Various models have been proposed in physics and social science, but all the models can be interpreted as one form of interaction model.

As an example of a typical interaction model in the world of physics, an Ising model can be mentioned. The Ising model is a model of statistical mechanics to explain the behavior of magnetic materials. The Ising model is defined by a spin taking a binary value of +1/−1 (or 0/1, up/down), an interaction coefficient indicating an interaction between spins, and an external magnetic field coefficient for each spin.

The Ising model is configured with a provided spin arrangement, an interaction coefficient, and an external magnetic field coefficient. The energy function (generally, referred to as Hamiltonian) of the Ising model is represented by the following equation.

[Mathematical Formula 1]

$$H(\sigma) = -\sum_{i<j} J_{i,j}\sigma_i\sigma_j - \sum_i h_i\sigma_i \quad (1)$$

In addition, $\sigma_i$ and $\sigma_j$ indicate values of the i-th and j-th spins, respectively, $J_{i,j}$ indicates an interaction coefficient between the i-th and j-th spins, $h_i$ indicates an external magnetic field coefficient for the i-th spin, and $\sigma$ indicates spin arrangement.

In Mathematical Formula (1), the first term is to calculate energy resulting from the interaction between spins. In general, the Ising model is represented as an undirected graph, and thus, the interaction from the i-th spin to the j-th spin and the interaction from the j-th spin to the i-th spin are not distinguished from each other. Therefore, in the first term, the influence of the interaction coefficient is calculated for combinations of $\sigma_i$ and $\sigma_j$ satisfying i<j. The second term is to calculate the energy due to external magnetic field for each spin.

The basis state searching of the Ising model is an optimization problem for obtaining the spin arrangement that minimizes the energy function of the Ising model. It is known that the basis state searching of the Ising model represented by a nonplanar graph is an NP-hard problem. In recent years, in order to solve this problem efficiently, a device for searching the basis state is proposed (Patent Document 1 and Patent Document 2).

In addition, it is also known that Boltzmann machine learning which is one method of machine learning can be realized by sampling the Ising model under a certain condition and calculating the expected value of the statistic quantity (Non-Patent Document 1).

In addition, there is known a cluster Monte Carlo algorithm (cluster exchanging Monte Carlo method; described later) (Non-Patent Document 2).

CITATION LIST

Patent Document

Patent Document 1: WO 2014/192153 A
Patent Document 2: JP 2016-51313 A

Non-Patent Document

Non-Patent Document 1: S. Yamanaka, M. Ohzeki, and A. Decelle, "Detection of Cheating by Decimation Algorithm," Journal of the Physical Society of Japan, vol. 84, no. 2, p. 024801, 2015.

Non-Patent Document 2: Houdayer, J. "A cluster Monte Carlo algorithm for 2-dimensional spin glasses." The European Physical Journal B-Condensed Matter and Complex Systems 22.4 (2001): 479-484.

SUMMARY OF THE INVENTION

Problems to be Solved by the Invention

In performing of searching the basis state of the Ising model and sampling the Ising model, a Markov chain Monte Carlo method (hereinafter, referred to as MCMC) is generally used. The MCMC is a method of estimating a desired statistic quantity by performing state sampling while stochastically transiting between states.

FIG. 1 illustrates a conceptual diagram of an energy landscape of the Ising model. In this figure, a spin arrangement is plotted on the horizontal axis, and energy at the spin arrangement is plotted on the vertical axis.

In a stochastic transition, transition is stochastically repeated to a certain state σ' in the neighborhood of the current state σ. The probability of transition from the state σ to the state σ' is called the transition probability P(σ,σ'). A metropolis method and a hot bath method are known for the transition probability. For example, the transition probability of the Metropolis method is represented by Mathematical Formula (2), and the transition probability of the hot bath method is represented by Mathematical Formula (3). T is a parameter commonly referred to as temperature, which represents a degree of easiness of transition between states.

[Mathematical Formula 2]

$$P(\sigma, \sigma') = \min\left\{1, \exp\left(-\frac{H(\sigma') - H(\sigma)}{T}\right)\right\} \quad (2)$$

[Mathematical Formula 3]

$$P(\sigma, \sigma') = \frac{1}{2}\left\{1 + \tanh\left(-\frac{H(\sigma') - H(\sigma)}{2T}\right)\right\} \quad (3)$$

As a method of generating the neighborhood state σ', changing of the value of one spin from the current state σ is generally used. Searching of the entire spins is performed by changing the spins one by one in order. For example, in the case of FIG. 1, when one spin is inverted from a state A, a state B is obtained, and when one spin is further inverted, a state C is obtained.

However, when updating the spins one by one in order, it is difficult to exceed a high energy barrier in the state transition, and a probability of being trapped by the spin arrangement in a specific region increases. For example, in the case of the example illustrated in FIG. 1, it is not possible to make a transition from the state A to the state C at once, but the transition can be made through the state B. However, if the energy of the state B is sufficiently larger than the energy of the state A, the probability of transition from the state A to the state B becomes lower. As a result, in a finite number of times of state transition, the transition to the state C does not occur, and the possibility of visiting this area becomes lower.

Originally, in spite of having to search for each spin state based on appropriate weighting, transition between the states becomes difficult, so that the sampling accuracy and the solution accuracy of the basis state searching is lowered. As a result, the number of times of sampling of the MCMC needs be increased, and thus, the energy efficiency of the entire calculation system is reduced.

This problem can be solved by simultaneously changing the values of a plurality of spins, calculating the energy difference before and after changing, and determining the presence or absence of stochastic transition based on Mathematical Formula (2). As an example, Cluster Monte Carlo algorithm is known (Non-Patent Document 2). For example, in the case of the example illustrated in FIG. 1, the state C is allowed to be in the neighborhood of the state A.

However, in a case where a plurality of spins are changed, it is necessary to transmit the value of the spin to an externally connected central processing unit (CPU) and perform calculation in order to calculate the energy difference. In general, this communication takes time, which causes problems such as an increase in calculation time and a decrease in energy efficiency. Therefore, realization of hardware for speeding up the MCMC is required.

Solutions to Problems

Outline of representative ones of the inventions disclosed hereinafter will be briefly described as follows.

One aspect of the present invention is an information processing apparatus including a first array circuit and a second array circuit. Each array circuit includes a plurality of units. Each of the plurality of units includes: a first memory cell that stores a value indicating a state of one node of an interaction model; a second memory cell that stores an interaction coefficient indicating an interaction from a node of an adjacent unit connected to the self unit in the same array circuit as that of the self unit; a third memory cell that stores a flag for controlling the value of the first memory cell; a first logic circuit that determines a value indicating a next state of the one node based on a value indicating a state of the node of the adjacent unit and the interaction coefficient; and a second logic circuit that changes the value of the first memory cell according to a value of the flag. Furthermore, each of the plurality of units includes an inter-array wire for transmitting the content of the first memory cell of the self unit to the corresponding unit of the other array circuit and receiving the content of the first memory cell of the corresponding unit, and the flag is generated based on information received through the inter-array wire.

Another aspect of the present invention is an information processing apparatus including a plurality of Ising chips and a controller that controls the plurality of Ising chips. Each of the plurality of Ising chips includes a plurality of units, and each of the plurality of units maintains a spin state. The controller instructs one set of Ising chips among the plurality of Ising chips to compare the values of the spin states of the corresponding units and instructs the one set of Ising chips to invert values of a portion of spins among the spins of which the values of the spin states of the corresponding units are different.

Effects of the Invention

It is possible to realize hardware for speeding up MCMC.

MODE FOR CARRYING OUT THE INVENTION

Figure 1:
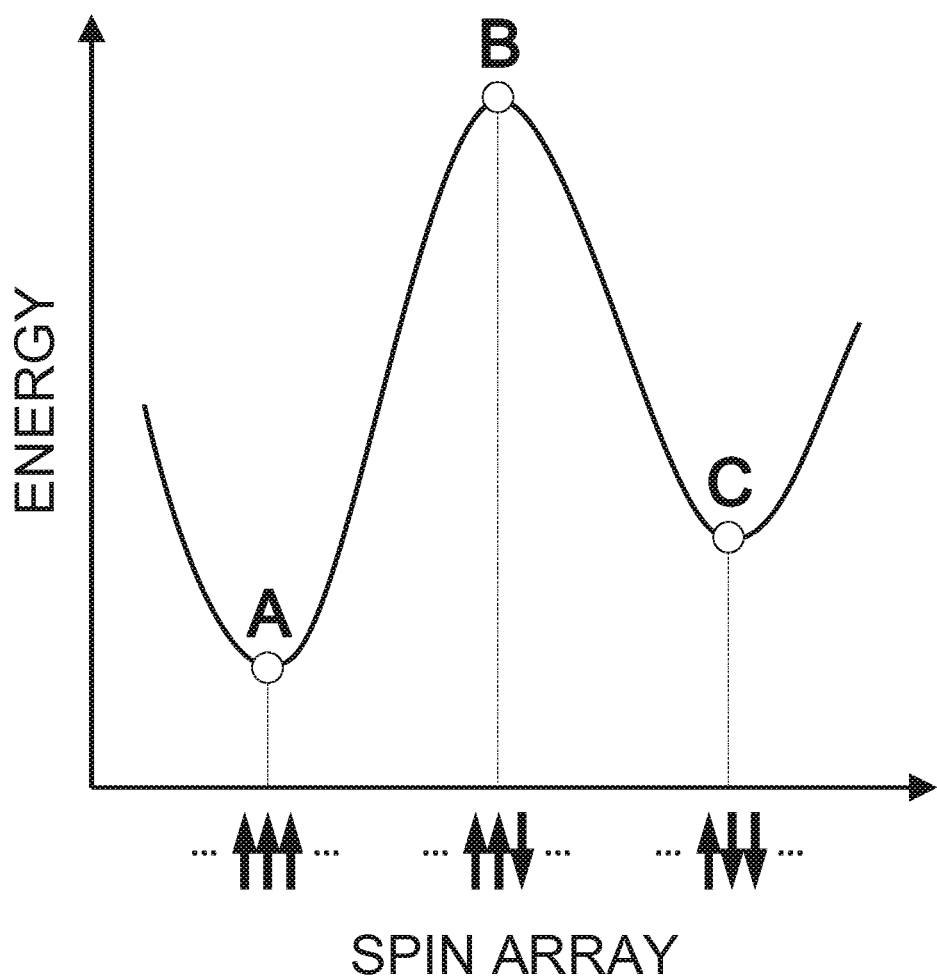
FIG. 1 is a conceptual diagram of an energy landscape of an Ising model.

In the following embodiments, if necessary for the convenience, the embodiments will be divided into a plurality of sections or embodiments, and description thereof will be made. However, unless otherwise stated, these embodiments and the like are not unrelated to each other, but one embodiment is in a relationship such as modifications, details, supplementary explanation of a portion or the whole of the other embodiments. In addition, in the following embodiments, when the number of elements and the like (including the number, numerical value, amount, range, and the like) are referred to, unless otherwise stated or unless otherwise obviously limited to a specific number in principle, the number is not limited to the specific number and may be a specific number or more or less.

In addition, in the following embodiments, unless otherwise stated or unless otherwise considered to be obviously indispensable in principle, it goes without saying that the constituent elements (including the element steps and the like) are not necessarily indispensable.

Similarly, in the following embodiments, when shapes, positional relationships, and the like of constituent elements, and the like are referred to, unless otherwise stated or unless otherwise considered to be obviously indispensable in principle, shapes and the like substantially approximate or similar to the shapes and the like are included. This is also applied to the above-mentioned numerical values and ranges.

Hereinafter, embodiments will be described in detail with reference to the drawings. In addition, in all the drawings illustrating the embodiments, the same components are denoted by the same reference symbols in principle, and the redundant description thereof will be omitted. In addition, in the following embodiments, description of the same or similar components will not be repeated in principle unless particularly necessary. When there are a plurality of elements having the same or similar functions, the same reference numerals are attached with different subscripts for description in some cases. However, if there is no need to distinguish between a plurality of elements, subscripts may be omitted for description in some cases.

In this specification and the like, notations such as "first", "second", and "third" are attached to identify constituent elements, and the notations do not necessarily limit numbers or orders. In addition, a number for identifying the constituent element is used for each context, and thus, the number used in one context does not necessarily indicate the same constituent element in other contexts. In addition, it does not preclude the possibility that a constituent element identified by a certain number has a function of another constituent element identified by another number.

The embodiment relates to a semiconductor device and an information processing apparatus which can be manufactured inexpensively and easily and can calculate an arbitrary interaction model such as an Ising model.

One example described in the embodiment is a semiconductor integrated circuit device including a plurality of Ising chips, a controller for controlling the plurality of Ising chips, and a state exchanging clock generator connected to the controller and the plurality of Ising chips. In response to the clock signal generated by the state exchanging clock generator, the controller instructs an adjacent Ising chip among the plurality of Ising chips to compare the values of corresponding spins. In response to the clock signal generated by the state exchanging clock generator, the controller instructs the adjacent Ising chip that has compared the values of the corresponding spins to invert values of a portion of spins among the spins having different values of the corresponding spins.

The semiconductor device according to the embodiment is a semiconductor device that executes calculation based on a Markov chain Monte Carlo method while simultaneously updating a plurality of variables instead of sequentially updating a single variable. The semiconductor device includes a memory, a reading unit that reads data from the memory, a majority decision circuit that inputs a result of performing a predetermined operation on the data read by the reading unit, and a writing circuit that inputs an output of the majority decision circuit, and the semiconductor device stochastically inverts a value of a predetermined signal at the preceding stage of the majority decision circuit. According to such an example, the spin state of the interaction network can be changed at a high speed and to a large extent.

According to one embodiment, it is possible to provide a semiconductor device and an information processing apparatus which can be manufactured inexpensively and easily and can calculate an arbitrary interaction model such as an Ising model.

<(1) Interaction Model>

As described above, various physical phenomena and social phenomena can be represented by interaction models. As a feature of the interaction model, the influence between nodes is restricted to the interaction between two nodes (interaction between two bodies). For example, in considering the mechanics of planets in outer space, it can be interpreted as a kind of interaction model in that there is an interaction due to universal gravitation between planets, that is, nodes. The interplanetary influence exists not only between two planets but also among three or more planets. These planets influence each other and exhibit complicated behavior (causing so-called a three body problem or a many body problem). As an example of a typical interaction model in the world of physics, the above Ising model can be mentioned.

In addition, in the field of biology, a neural network modeling a brain is an example of the interaction model. In the neural network, artificial neurons modeling neurons of nerve cells are nodes, and artificial neurons have interaction called synaptic connection. In addition, there are cases where bias is applied to each neuron.

In the world of social science, for example, by considering human communication, it can be easily understood that there is an interaction formed by nodes, that is, human beings with language and communication. In addition, it can also be considered that individual bias exists between the human beings. Therefore, researches have been made to clarify characteristics by simulating human communication as a common Ising model or the like in terms of an interaction model.

In the following, an example of a semiconductor device that performs basis state searching or sampling of an Ising model and an information processing apparatus that controls the semiconductor device as an accelerator will be described.

<(2) Ising Model Extended to Directed Graph>

In this embodiment, hereinafter, a model represented by the following Mathematical Formula (4), which is an extension of the Ising model, is referred to as an Ising model.

[Mathematical Formula 4]

$$H(\sigma) = -\sum_{i \neq j} J_{i,j}\sigma_i\sigma_j - \sum_i h_i\sigma_i \qquad (4)$$

The difference from the Ising model expressed by Mathematical Formula (1) is that such interaction as indicated by a directed graph is permitted in Mathematical Formula (4). In general, the Ising model can be drawn as an undirected graph in graph theory. This is because the interaction of the Ising model does not distinguish the interaction coefficient $J_{i,j}$ from the i-th spin to the j-th spin and the interaction coefficient $J_{j,i}$ from the j-th spin to the i-th spin.

In this embodiment, since the Ising model is extended and $J_{i,j}$ and $J_{j,i}$ can be applied to the Ising model while being distinguished from each other, the Ising model with a directed graph can be handled. In the case of handling the Ising model with an undirected graph as the Ising model with a directed graph, the same interaction coefficient can be defined simply for both directions of $J_{i,j}$ and $J_{j,i}$. In this case, even for the same model, the value of energy in the energy function of Mathematical Formula (4) is doubled to the energy function in the energy function of Mathematical Formula (1).

<(3) Configuration of Information Processing Apparatus in Embodiment>

«(3-1) Overall Configuration of Information Processing Apparatus Including Semiconductor Device»

Figure 2:
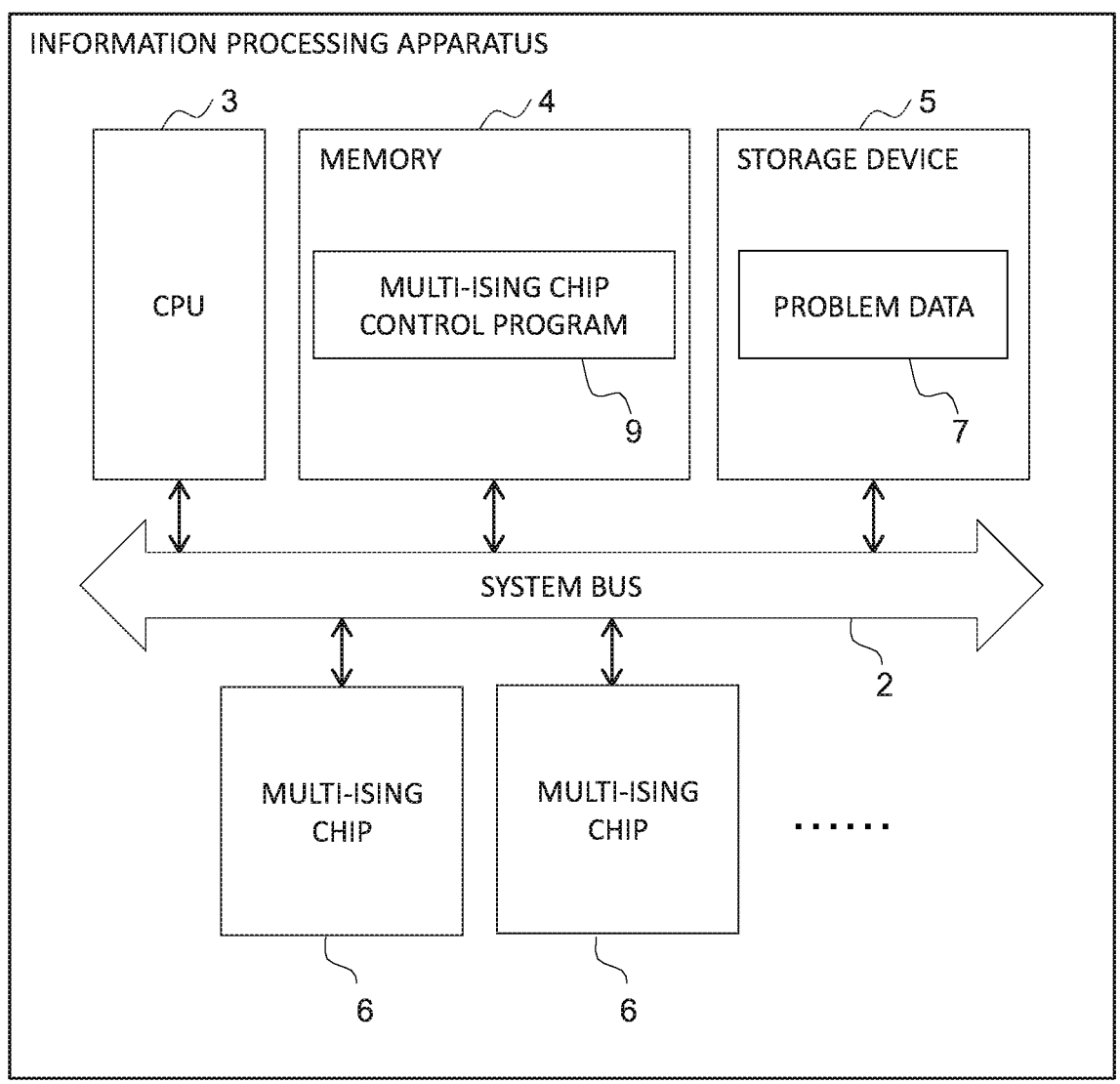
FIG. 2 is a block diagram illustrating an example of the overall configuration of an information processing apparatus including a semiconductor device according to an embodiment.
Figure 3:
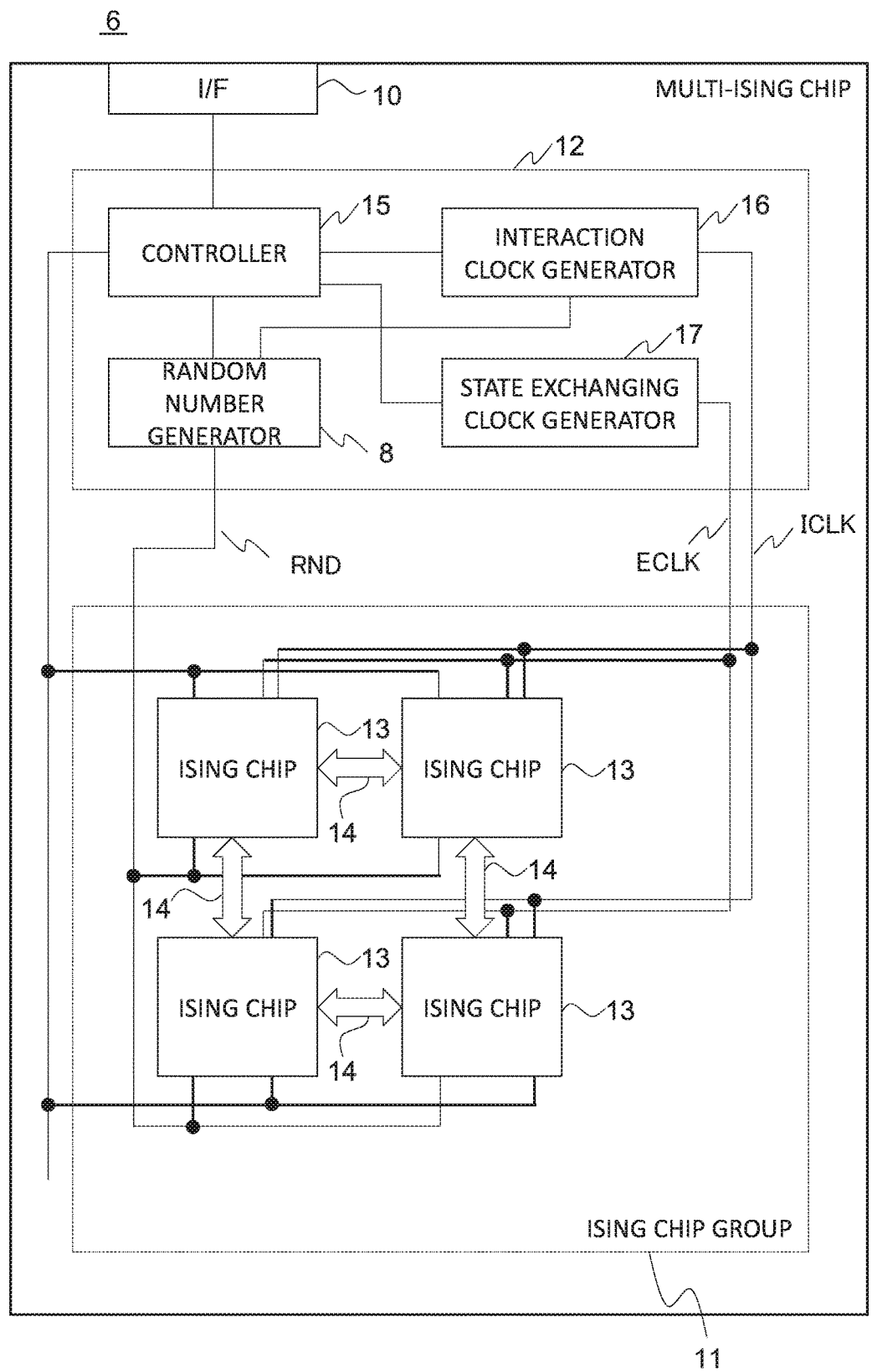
FIG. 3 is a block diagram illustrating an example of a configuration of a multi-Ising chip in the embodiment.

An overall configuration of an information processing apparatus including a semiconductor device will be described with reference to FIGS. 2 and 3. FIG. 2 is a block diagram illustrating an example of the overall configuration of an information processing apparatus including a semiconductor device according to this embodiment. FIG. 3 is a block diagram illustrating an example of a configuration of a multi-Ising chip in this embodiment.

FIG. 2 illustrates the information processing apparatus according to this embodiment. The information processing apparatus 1 is configured with a personal computer, a workstation, a server, or the like and includes a central processing unit (CPU) 3, a memory 4, a storage device 5, and a plurality of multi-Ising chips 6, which are connected via a system bus 2.

The CPU 3 is a processor that controls the overall operation of the information processing apparatus 1. In addition, the memory 4 is configured with, for example, a volatile semiconductor memory and is used to store various programs and the like. The storage device 5 is configured with, for example, a hard disk device, a solid state drive (SSD), and the like and is used to store programs and data for a long period.

In the case of this embodiment, the storage device 5 stores problem data 7 which is a problem of a single, Ising model format to be solved by the information processing apparatus 1, and the memory 4 stores a multi-Ising chip control program 9. The multi-Ising chip control program 9 is a program for performing control for solving a problem in each multi-Ising chip 6.

In addition, a program for converting problem data that are not in Ising model format into problem data 7 in an Ising model format may be stored in the memory 4. By doing so, it is possible to cope with problems that are not in an Ising model format, so that it is possible to improve the usefulness of the information processing apparatus 1.

The multi-Ising chip 6 is dedicated hardware for performing the basis state searching of the Ising model and has a form of an extension card mounted in the information processing apparatus 1 such as a graphics processing unit (GPU) which is dedicated hardware for a screen rendering process.

FIG. 3 is a configuration block diagram of the multi-Ising chip. As illustrated in FIG. 3, the multi-Ising chip 6 is configured to include an interface (I/F) 10, an Ising chip group 11, and a control unit 12 and exchanges commands and information with the CPU 3 (FIG. 2) via the interface 10 and the system bus 2 (FIG. 2).

The Ising chip group 11 is configured to include a plurality of Ising chips 13, each of which is dedicated hardware for performing basis state searching and sampling of an Ising model. The Ising chips 13 are connected by an inter-chip wire 14, and the Ising chips 13 exchange necessary information with each other through the inter-chip wire 14.

The control unit 12 has a function of controlling each Ising chip 13 constituting the Ising chip group 11 and includes a controller 15, an interaction clock generator 16, a state exchanging clock generator 17, and a random number generator 8.

The controller 15 is a processor that controls the entire operations of the multi-Ising chip 6, and the controller controls operations of each Ising chip 13 constituting the Ising chip group 11 or the interaction clock generator 16, the state exchanging clock generator 17, and the random number generator 8 according to commands applied via the system bus 2 (FIG. 2) and the interface 10 from the CPU 3 (FIG. 2) of the information processing apparatus 1.

The interaction clock generator 16 is a clock generator for generating an interaction clock ICLK. The interaction clock ICLK is provided to each of the Ising chips 13 constituting the Ising chip group 11. The random number generator 8 generates a random number RND which is a random bit string used in processing executed in each Ising chip 13. The random number RND is provided to each Ising chip 13.

The state exchanging clock generator 17 is a clock generator for generating a state exchanging clock ECLK. The state exchanging clock ECLK is provided to each of the Ising chips 13 constituting the Ising chip group 11.

«(3-2) Configuration of Ising Chip»

Figure 4:
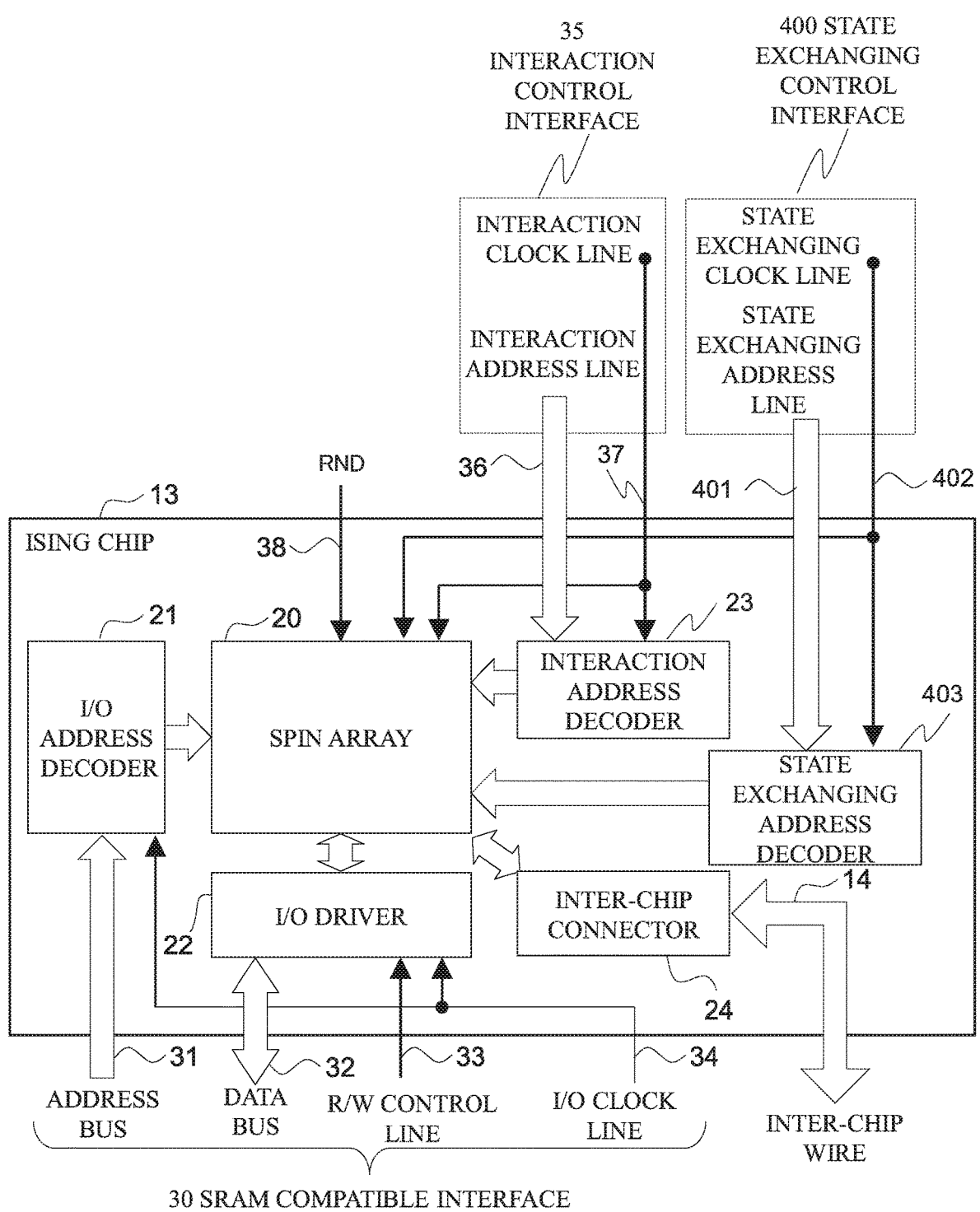
FIG. 4 is a block diagram illustrating an example of a configuration of an Ising chip in the embodiment.

The configuration of the Ising chip 13 will be described with reference to FIG. 4. FIG. 4 is a block diagram illustrating an example of the configuration of the Ising chip in this embodiment. The Ising chip is a semiconductor integrated circuit that includes spin arrays and updates values of spins by interaction calculation.

As illustrated in FIG. 4, the Ising chip 13 is configured to include a spin array 20, an input/output (I/O) address decoder 21, an I/O driver 22, an interaction address decoder 23, a state exchanging address decoder 403, and an inter-chip connector 24. In this embodiment, the Ising chip 13 is described assuming that the Ising chip is mounted as a complementary metal-oxide semiconductor (CMOS) integrated circuit which is widely used at present, but the Ising chip can also be realized as other solid-state elements.

The Ising chip 13 includes an address bus 31, a data bus 32, an R/W control line 33, and an I/O clock line 34 as an SRAM compatible interface 30 for performing reading/writing on memory cells of the spin array 20. In addition, the Ising chip also includes an interaction address line 36 and an interaction clock line 37 as an interaction control interface for controlling the basis state searching of the Ising model.

In the Ising chip 13, all the spin $\sigma_i$, the interaction coefficient $J_{i,j}$, and the external magnetic field coefficient $h_i$ of the Ising model are represented by information stored in the memory cells in the spin array 20. Setting of the initial state of the spin $\sigma_i$ and reading of the spin arrangement after the MCMC is performed are performed through the SRAM compatible interface 30. In addition, in the Ising chip 13, reading/writing of the interaction coefficient $J_{i,j}$ and the external magnetic field coefficient $h_i$ for setting the Ising model to execute MCMC in the spin array 20 is also performed through the SRAM compatible interface 30.

Therefore, addresses are provided to the spin $\sigma_i$ in the spin array 20, the interaction coefficient $J_{i,j}$ and the external magnetic field coefficient hi. In the case of reading/writing the spin $\sigma_i$, the interaction coefficient or the external magnetic field coefficient $h_i$ in the Ising chip 13, the corresponding address is supplied from the controller 15 to the I/O address decoder 21 via the address bus 31, and an R/W control signal for controlling reading/writing of the spin $\sigma_i$, the interaction coefficient $J_{i,j}$ and the external magnetic field coefficient $h_i$ is supplied from the controller 15 to the I/O driver 22 via the R/W control line 33.

Thus, the I/O address decoder 21 activates the word line of the spin array 20 based on the address supplied via the address bus 31, and the I/O driver 22 drives the corresponding bit line in the spin array 20 based on the R/W control signal supplied via the R/W control line 33. As a result, the initial value of the spin $\sigma_i$ or the setting values of the interaction coefficient $J_{i,j}$ and the external magnetic field coefficient $h_i$ supplied via the data bus 32 are set in the spin array 20, or the solution after the MCMC is executed is read out from the spin array 20 and output to the outside via the data bus 32.

In addition, the address bus 31, the data bus 32, and the R/W control line 33 constituting the SRAM compatible interface are synchronized with the I/O clock supplied from the control unit 12 to the Ising chip 13 via the I/O clock line 34.

In addition, the Ising chip 13 realizes the interaction between the spins inside the spin array 20 in order to perform the MCMC. An interaction control interface 35 externally controls this interaction. The Ising chip 13 receives an input of an address that designates a spin group, with which interaction is to be performed, and is provided from the controller 15 via the interaction address line 36 and performs the interaction in synchronization with an interaction clock from the interaction clock generator 16 input via the interaction clock line 37. The interaction address decoder 23 reads/writes the value of the spin, the interaction coefficient $J_{i,j}$, and the external magnetic field coefficient $h_i$ for the spin array 20 based on the address provided via the interaction address line 36.

The Ising chip 13 has a random number signal line 38 for injecting a random number RND in order to stochastically invert data read from a memory in the spin array 20 or a result of performing of a predetermined operation on this data as described later. The random number RND generated by the random number generator 8 described above with reference to FIG. 3 is provided to the spin array 20 via the random number signal line 38.

In addition, the Ising chip 13 realizes cluster exchanging (state exchanging) inside the spin array 20. A state exchanging control interface 400 externally controls this cluster exchanging. The Ising chip 13 receives, as an input, an address that designates a spin group, with which state exchanging is to be performed, and is provided from the controller 15 via the state exchanging address line 401 and performs the cluster exchanging in synchronization with a state exchanging clock from the state exchanging clock generator 17 input via the state exchanging clock line 402. The state exchanging address decoder 403 performs reading/writing of the memory cell N and the memory cell M described later for the cluster exchanging to the spin array based on the address provided via the state exchanging address line 401.

The inter-chip connector 24 functions as an interface in transmitting and receiving the necessary values of spin $\sigma_i$ to and from the Ising chip 13 arranged adjacent thereto.

«(3-3) Configuration of Spin Array»

Figure 5:
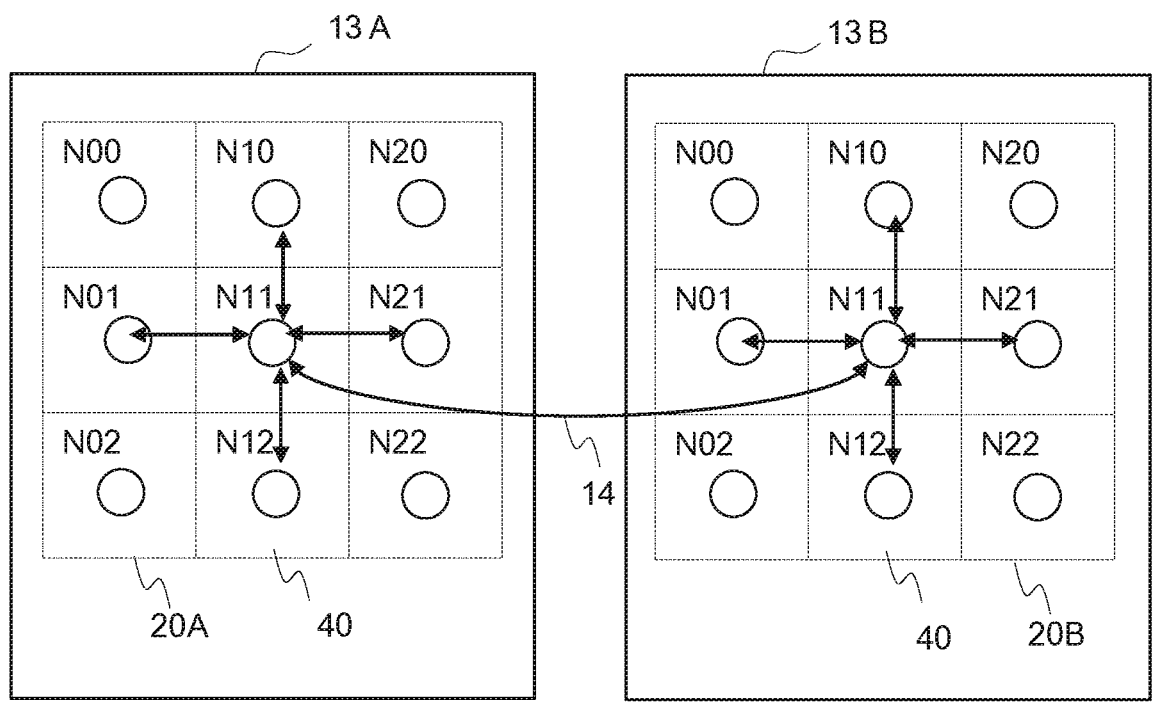
FIG. 5 is a conceptual diagram illustrating an example of a configuration of a spin array of a two-dimensional lattice in the embodiment.

FIG. 5 is a conceptual diagram schematically illustrating a spin array of a two-dimensional lattice and a connection relation thereof. The spin array 20 includes a memory that retains one spin $\sigma_i$ and an interaction coefficient $J_{i,j}$ and an external magnetic field coefficient $h_i$ associated with the spine and a configuration where a plurality of spin units 40 as basic configurational units are arranged side by side and each of the spin units 40 has an arithmetic circuit for realizing MCMC.

In FIG. 5, the spin array 20 has 3×3 (nine) of spin units 40, and the spin of the spin unit 40 is indicated by a circle. Herein, two spin arrays 20A and 20B are focused and illustrated. The spin array 20 is realized by one Ising chip 13.

The value of the spin of another spin unit is input to one spin unit 40 illustrated in FIG. 5. In FIG. 5, for the convenience, values of spins of four spin units arranged on the upper, lower, left and right are assumed to be input. For the convenience, the spin unit for inputting the value of spin to a certain spin unit is referred to as an "adjacent spin unit (adjacent node)". However, this does not necessarily denote that the spin units are arranged to be adjacent physically or geometrically.

The spin unit 40 has a memory cell N for holding the value of the spin. With respect to the value of the spin, for example, the value of spin up/down is represented as HIGH/LOW. In FIG. 5, while paying attention to the central spin unit of each spin array 20, input and output of the values of the spins are indicated by arrows. In addition to the values of the spins, the spin unit 40 also has memory cells that retain external magnetic field coefficients and interaction coefficients between the adjacent spin units, respectively. The configuration of the spin array that performs such interaction is described in, for example, Patent Document 2.

In this Example, the spin unit 40 further includes a memory cell M representing a difference with the spin of the corresponding spin unit 40 of the other spin array 20. That is, as illustrated in FIG. 5, each of the spin arrays 20A and 20B of one set transmits the value of the spin of the spin unit 40 to the corresponding spin unit 40 by using the inter-chip wire 14. In FIG. 5, the corresponding spin units are denoted by the same reference numeral as $N_{11}$. Hereinafter, for the convenience, these spin units will be referred to as "corresponding spin units". Upon receiving the value of the spin of the corresponding spin unit, the spin unit 40 determines whether or not the value is different from the value of the spin of the self spin unit and stores the result of determination in the memory cell M.

In addition, in FIG. 5, the position of the spin unit is indicated by a position in the horizontal and vertical directions like Nxy. By arranging the spin units 40 in a tile pattern, the spin array 20 is realized. In FIG. 5, two spin arrays including the spin units 40 are grouped in a set to exchange the values of the spins with each other. However, three or more spin arrays may be grouped into one set to exchange the values of spins with each other.

«(3-4) Configuration of Spin Unit»

Figure 6:
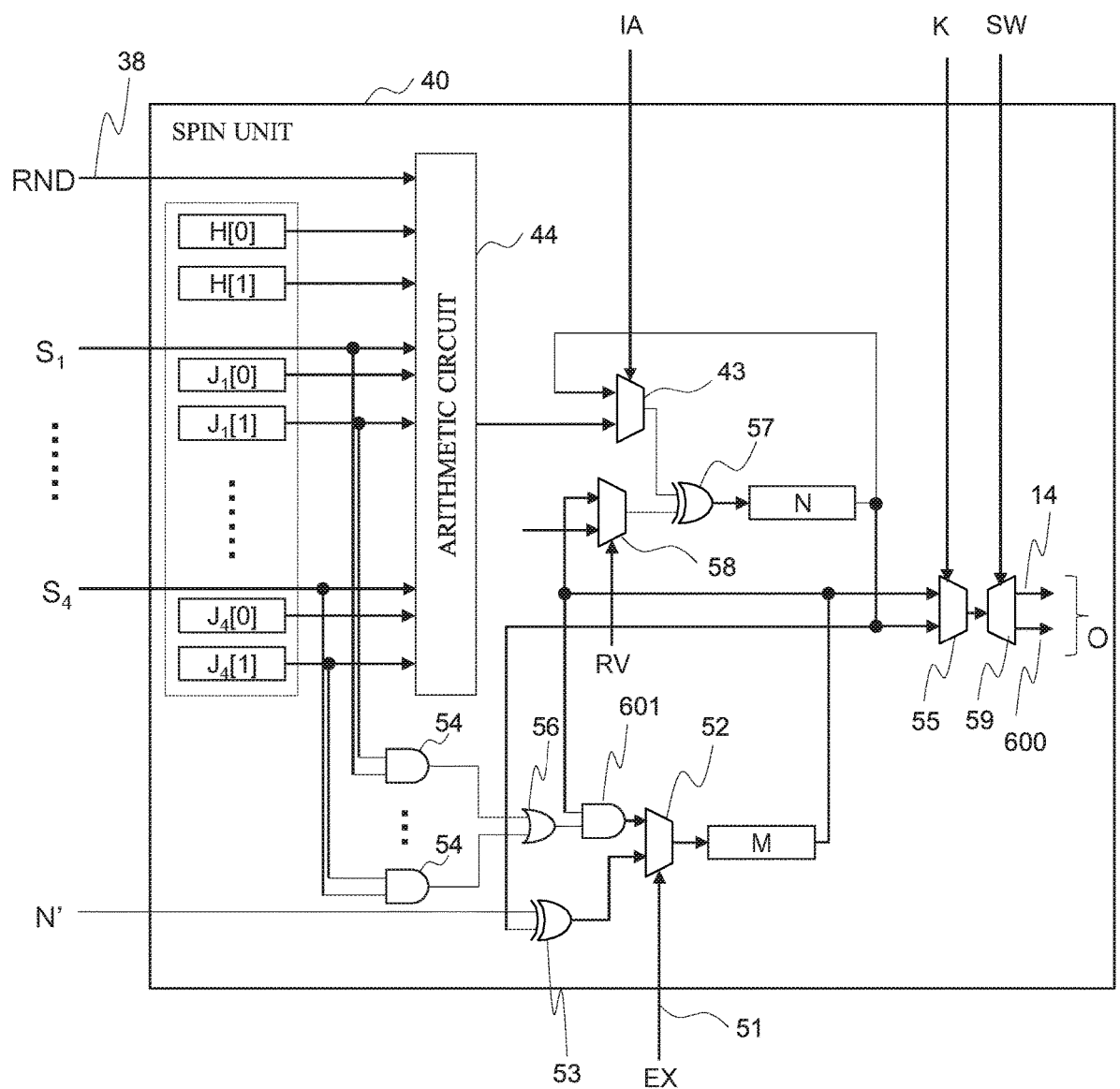
FIG. 6 is a circuit diagram illustrating an example of a configuration of a spin unit in the embodiment.

FIG. 6 is a circuit block diagram illustrating an example of the configuration of the spin unit 40 in this embodiment. One spin unit corresponds to one node of the Ising model. Although not illustrated, word lines and bit lines, which are interfaces for accessing from the outside of the Ising chip 13, are arranged in the memory cell included in the spin unit 40, and the read/write timing is controlled. This follows a control scheme of a semiconductor memory in the related art, and the technique described in, for example, Patent Document 2 can be applied to portions other than those specifically mentioned in this specification.

The configuration of the spin unit 40 will be described with reference to FIG. 6. A memory cell N is a memory cell for representing spin and holds the value of spin. In the Ising model, the values of spins are +1/−1 (expressing +1 as up and −1 as down), and these values are allowed to correspond to binary values 0/1 that the memory cell can retain. For example, +1 corresponds to 1, and −1 corresponds to 0.

The memory cell M is a memory cell for representing whether or not the value of the spin of a corresponding spin unit of a different Ising chip 13 is different or representing whether or not the value of the spine is included in a cluster. A premise of this embodiment is that each Ising chip 13 in the multi-Ising chip 6 performs a basis state searching of the same model.

When the Ising model is regarded as a directed graph, as viewed from a certain spin, the spin has a coefficient of influence of other spins on the spin of the self spin unit. The coefficients of the influence of spin of the self spin unit on other spins belong to other spins.

In the example of FIGS. 5 and 6, the spin unit 40 is connected to a maximum of five spin units. Namely, by paying attention to $N_{11}$ in FIG. 5, the values $S_1$ to $S_4$ of the spins are acquired from four spin units $N_{01}$, $N_{10}$, $N_{12}$ and $N_{21}$, or the spin S (value stored in the memory cell N of the self spin unit) of the self spin unit is transmitted to the above spin units. In addition, the spin unit is connected to the corresponding spin unit 40 by using the inter-chip wire 14, so that the value of the spin can be transmitted and received.

The spin unit 40 includes four sets of memory cells for storing interaction coefficients $J_1$ to $J_4$ indicating the influence on the spin of the self spin unit. Furthermore, the spin unit includes a set of memory cells for storing the external magnetic field coefficient H.

In the Ising chip 13 of this embodiment, each of the external magnetic field coefficient H and the interaction coefficients $J_1$ to $J_4$ are allowed to correspond to three values of +1/0/−1. Therefore, in order to represent the external magnetic field coefficient and the interaction coefficient, 2-bit memory cells are required. For this reason, in this embodiment, one set of 1-bit memory cells is used for each coefficient.

Each of the memory cells H[0] and $J_k[0]$ (1≤k≤4) is set to 1 when the corresponding external magnetic field coefficient and interaction coefficient are positive, and each of the memory cells is set to 0 when the corresponding external magnetic field coefficient and interaction coefficient are 0 or less. In addition, each of the memory cells H[1] and $J_k[1]$ is provided with 1 when the absolute value of the corresponding coefficient is 1, and each of the memory cells is provided with 0 when the absolute value of the corresponding coefficient is 0. For example, H[0]=0 and H[1]=1 when the external magnetic field coefficient held by the spin unit is −1.

Each of the memory cell N and the memory cells M, H[u], and $J_k[u]$ (0≤u≤1, 1≤k≤4) in the spin unit 40 need to be read/written from the outside of the Ising chip 13. Therefore, as described above, the spin unit 40 has bit lines and word lines (not illustrated).

In the Ising chip 13, the spin units 40 are arranged in a tile pattern on a semiconductor substrate so that the bit lines and the word lines are connected, and the spin units 40 are driven, controlled, or read by the I/O address decoder 21 and the I/O driver 22. Therefore, the memory cells in the spin unit 40 can be read/written by the SRAM compatible interface 30 of the Ising chip 13 similarly to a general static random access memory (SRAM). Such an SRAM compatible interface is disclosed in Patent Document 2.

Since the spin units 40 perform updating simultaneously, each of the spin units 40 independently includes a circuit for calculating the interaction and determining the spin state of the next spin. In FIG. 6, the spin unit 40 exchanges signals IA, N', O, K, SW, $S_k$ (1≤k≤4), RND, RV, and EX with interfaces to the outside.

The signal IA is supplied from the state exchanging control interface 400, and a switching signal for permitting the spin of the spin unit 40 to be updated is input. The selector 43 is controlled by this switching signal.

The signal N' transfers the value of the memory cell N included in the corresponding spin unit 40 in the spin array of other Ising chips (the Ising chips 13 connected by the inter-chip wire 14 in FIG. 5). This is input from the inter-chip connector 24.

The signal O is the output of the spin unit 40. With respect to the content of the signal O, the content of the memory cell N and the content of the memory cell M are switched by the selector 55 which is controlled by the signal K. The output destination of the signal O is switched between the other spin unit in the same Ising chip and the corresponding spin unit in the other Ising chip by the selector 59 which is switched by the signal SW. That is, among the signal paths indicated by the arrows in FIG. 5, the output destination is switched between the inter-chip wire 14 and the intra-chip wire 600 in the Ising chip 13.

The signal K is a signal for switching the output of the selector 55 and selecting and outputting the content of the memory cell N and the content of the memory cell M and is supplied from the state exchanging control interface 400. In a case where the signal K is HIGH, the output is the content of memory cell M. In a case where the signal K is LOW, the output is the content of memory cell N. The output of the selector 55 is an input to the selector 59.

The signal SW is a signal for switching the output destination of the selector 59 and is supplied from the state exchanging control interface 400. In a case where the signal SW is HIGH, the output is output to the inter-chip wire 14; and in a case where the signal SW is LOW, the output is output to the other spin unit within the chip.

With respect to the signal $S_k$ (1≤k≤4), the signal of the value of spin from each of the other spin units 40 (the adjacent spin units in the Ising chip 13 of FIG. 5 in terms of the topology) is received.

The signal RND is a random number for changing the bit probability and is supplied from the random number signal line 38.

The signal RV is supplied from the state exchanging control interface 400 and controls the selector 58. Among the inputs to the selector 58, the signal on the side not connected to the memory cell M is always HIGH.

The signal EX is supplied from the state exchanging control interface 400 and controls the selector 52. When the signal EX is HIGH, the selector 52 outputs the output of the AND gate 601; and when the signal EX is LOW, the selector 52 outputs the output of the XOR gate 53.

An arithmetic circuit 44 receives the values read from the memory cells H[u] and $J_k[u]$ (0≤u≤1, 1≤k≤4) and the signal RND and perform a stochastic behavior such as a metropolis method or a hot bath method required by the MCMC.

«(3-5) Operation of Spin Unit»

Figure 7:
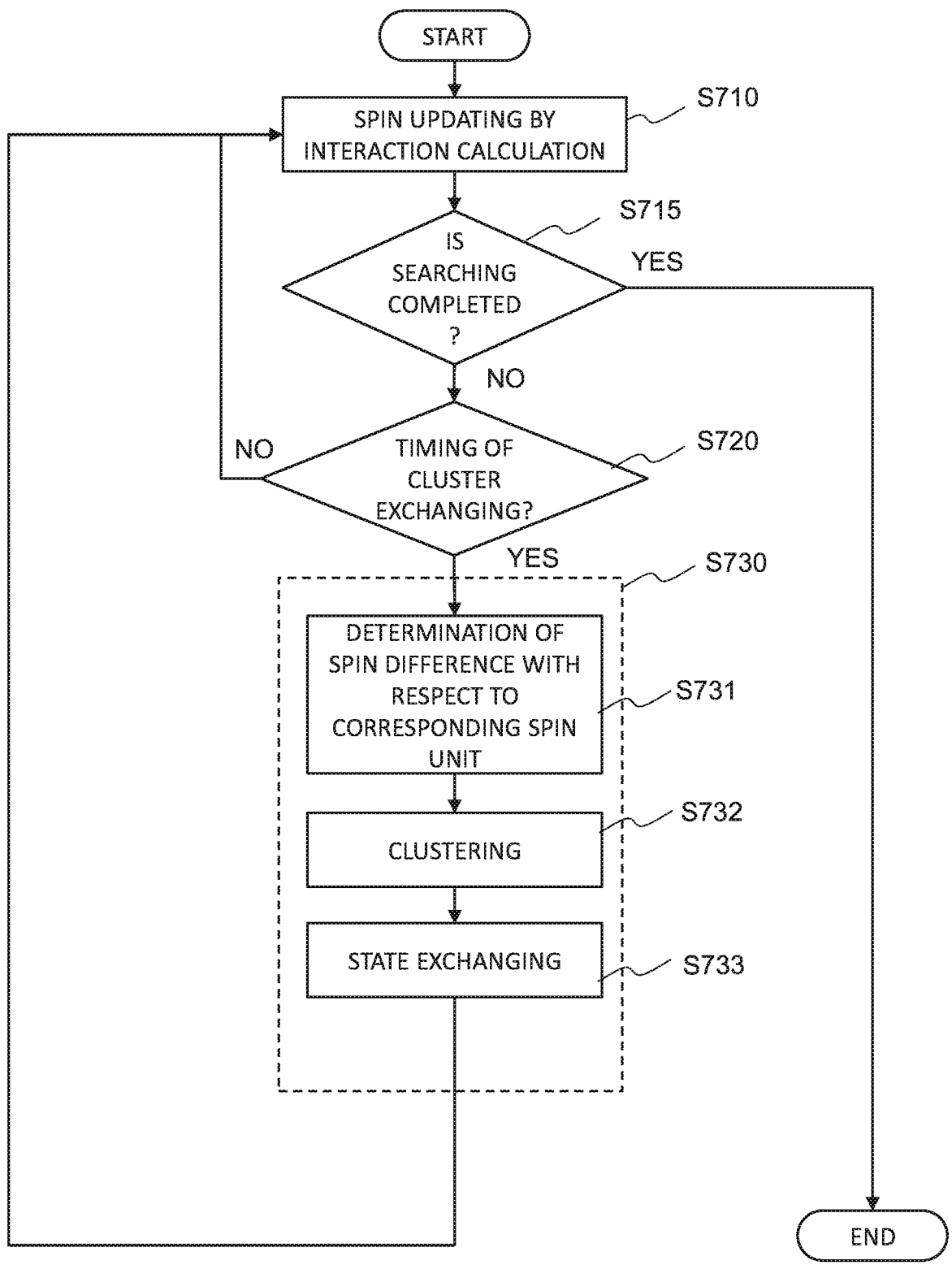
FIG. 7 is a flowchart illustrating a processing procedure of Example.

In the spin unit of this Example, the cluster exchanging Monte Carlo method is realized in terms of hardware, and the values of a plurality of spins are changed simultaneously, so that an increase in the number of times of sampling of the MCMC is suppressed and the energy efficiency of the entire calculation system is improved. FIG. 7 is a flowchart illustrating the overview of the operations of the spin unit 40 of this Example. FIGS. 8A to 8F are diagrams illustrating signal paths in respective operations with bold arrows.

A series of processes performed in the spin unit will be described with reference to FIGS. 8A to 8F in addition to FIG. 7. First, when the signals K, SE, and RV and the signal IA are LOW, the output of the arithmetic circuit 44 is written in the memory cell N based on the values $S_1$ to $S_4$ of the spins. The values $S_1$ to $S_4$ of the spins are values obtained from adjacent spin units in the same Ising chip. The selector 55 outputs the value of the memory cell N as a spin S. The value of the spin Sis transmitted to another spin unit in the same Ising chip by the selector 59.

The arithmetic circuit 44 determines a value indicating the next state of the spin by using the interaction coefficient read from the memory cells H[u] and $J_k$[u], the values $S_1$ to $S_4$ of the spins, and the random number RND and stores the value. Therefore, in this state, the spin unit executes the spin updating by the interaction calculation realized in the related art by using the information of the adjacent spin unit (spin updating process S710, refer to FIG. 8A). The process timing is controlled based on the interaction clock ICLK. The spin updating by the interaction calculation described in, for example, Patent Document 1 and Patent Document 2, and thus, the details thereof are omitted.

Next, the cluster exchanging process (process S730) will be described. This process is executed at a desired timing in the course of the spin updating which is realized in the related art. The timing and the number of times depend on a hardware configuration and a problem to be solved, but these are arbitrary. This control can be performed by instructing a start timing from the state exchanging control interface 400 under the control of the multi-Ising chip control program 9 (process S720). The timing is controlled based on the state exchanging clock ECLK. For example, it is conceivable that this process S730 is performed more (high frequency) in the initial stage of the basis state searching and less (low frequency) in the latter half stage thereof.

In the cluster exchanging process, the signal IA is set to HIGH, and normal spin updating is stopped. As illustrated in FIG. 7, the cluster exchanging process (process S730) includes three steps. These steps are determination of spin difference with respect to the corresponding spin unit (process S731), clustering of the spin unit (process S732), and changing of the value of spin of the clustered spin unit (process S733).

As a result of the clustering of the spin unit (process S732), the content of the memory cell M indicates whether or not the self spin unit is included in the cluster in the cluster exchanging Monte Carlo method. If the memory cell M is LOW, the self spin unit is not included in the cluster, and if it is HIGH, the self spin unit is included in the cluster. Then, the spins of the spin unit belonging to the cluster are collectively changed.

Figure 8A:
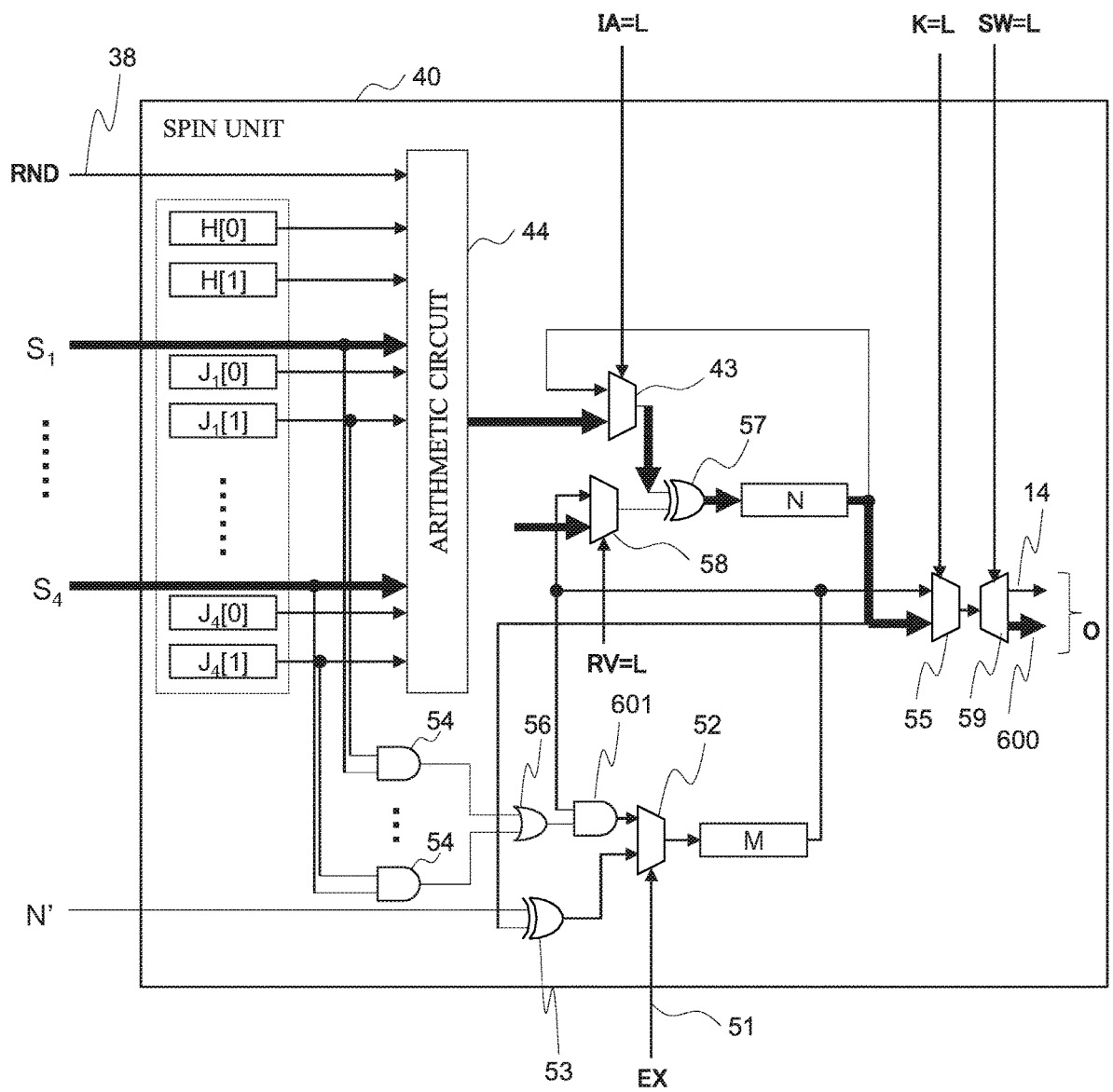
FIG. 8A is a circuit diagram illustrating an example of an operation state of a spin unit during processing.
Figure 8B:
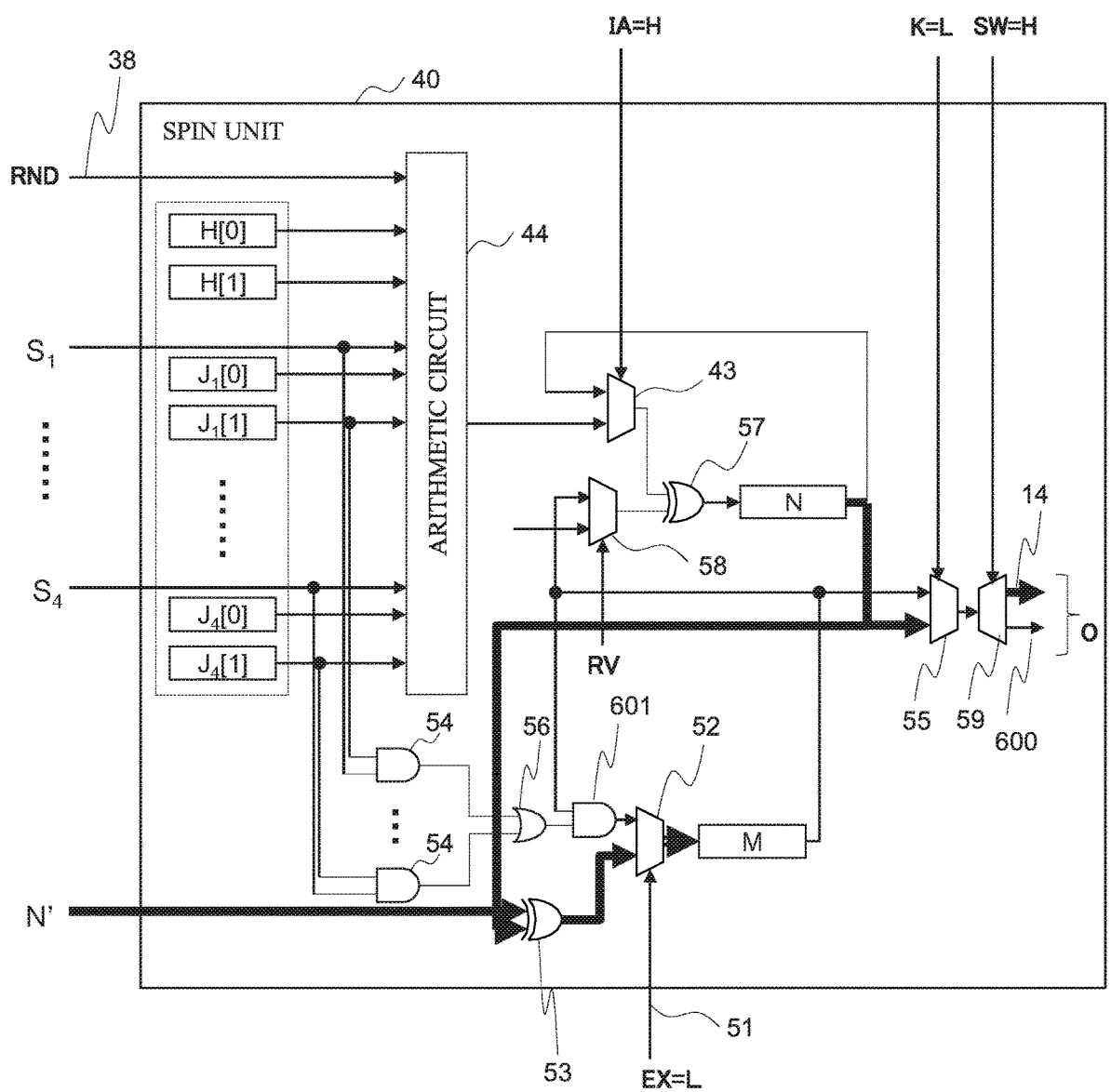
FIG. 8B is a circuit diagram illustrating an example of an operation state of a spin unit during processing.

In the determination of spin difference with respect to the corresponding spin unit (process S731), in the state where the signal IA is HIGH, the signal EX is set to LOW, and the signal SW is set to HIGH while the signal K is maintained at LOW (refer to FIG. 8B). As a result, the value of spin, which is the content of the memory cell N, is transmitted to the corresponding spin unit 40 of the adjacent Ising chip 13 through the inter-chip wire 14. This corresponds to, for example, the Ising chips 13A and 13B in FIG. 5 informing the center spin unit of the spin state.

In the reception side, the selector 52 outputs the value of the XOR gate 53. The output of the XOR gate 53 indicates whether or not the spin N of the self spin unit and the corresponding spin N' of the adjacent system (the spin of the corresponding spin unit 40 of the corresponding Ising chip 13) are different values, and the result is written in the memory cell M. As a result of the logic XOR, LOW is written if the spins are the same; and HIGH is written if the spins are different. The spin unit where HIGH is written in the memory cell M is referred to as a "mismatched spin unit" for the convenience.

Figure 8C:
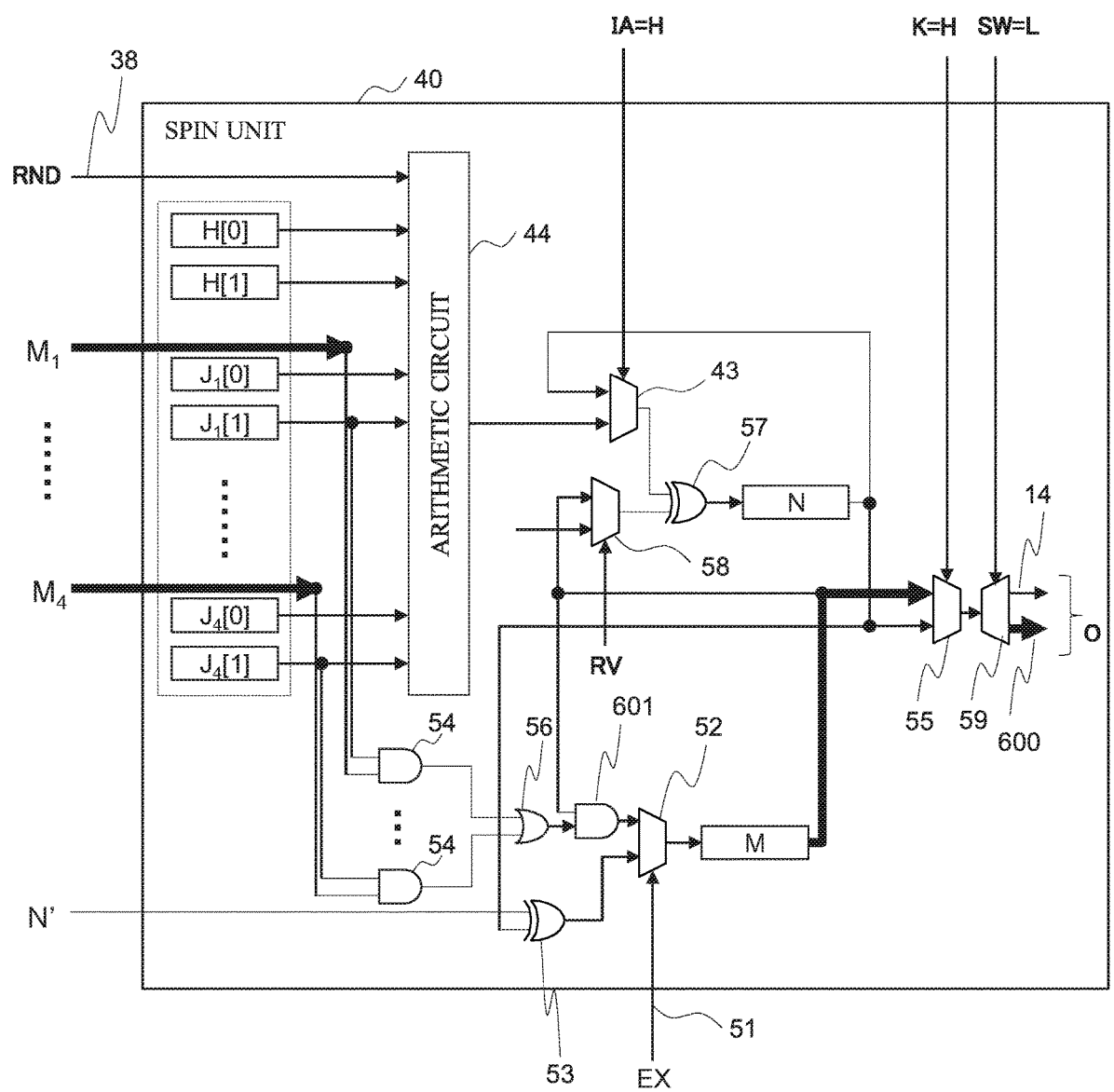
FIG. 8C is a circuit diagram illustrating an example of an operation state of a spin unit during processing.

Next, while the signal IA is maintained at HIGH, the signal K is set to HIGH, and the signal SW is set to LOW (refer to FIG. 8C). As a result, the content of the memory cell M indicating the difference in spin is transmitted to the adjacent spin unit with the same chip through the intra-chip wire 600. The adjacent spin unit receives the contents (indicated by $M_1$ to $M_4$) of the memory cell M. At this time, the signal IA is HIGH, and the output from the arithmetic circuit 44 is not supplied to the memory cell N.

Next, in clustering the spin unit (process S732), a set of a portion of the mismatched spin units is extracted as a cluster. In this embodiment, as an example, the cluster is configured as follows.

Figure 8D:
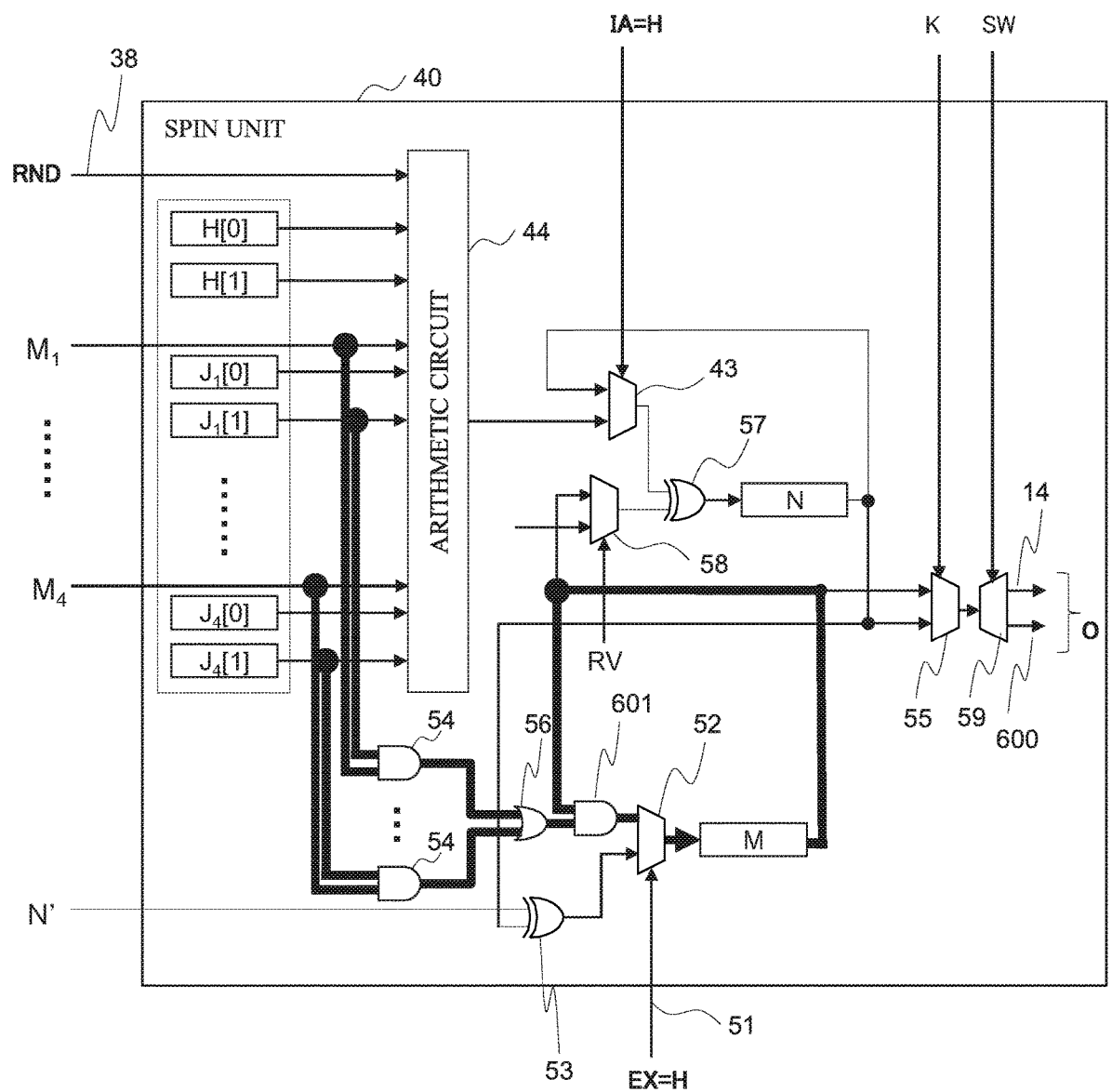
FIG. 8D is a circuit diagram illustrating an example of an operation state of a spin unit during processing.

That is, while the signal IA is HIGH, the signal EX is set to HIGH (refer to FIG. 8D). Then, the selector 52 outputs the value of the AND gate 601. The AND gate 601 outputs the logic AND of the value of the OR gate 56 and the value of the memory cell M. The OR gate 56 receives, as inputs, the outputs of the plurality of AND gates 54. The AND gate 54 receives, as inputs, the signal $M_k$ (1≤k≤4) and the memory cell $J_k$[1] (1≤k≤4) output from the adjacent spin unit. As described above, since $J_-$[1] is promised to represent the absolute value of the corresponding coefficient, when the interaction coefficient is 0, the corresponding AND gate 54 outputs LOW.

In the process of FIG. 8D, only in a case where there is non-zero interaction with an adjacent spin unit and the adjacent spin unit is a mismatched spin unit, the corresponding AND gate 54 outputs HIGH, and the results are input to the OR gate 56.

In addition, in a case where there is non-zero interaction with an adjacent spin unit and there is at least one case where the adjacent spin unit is a mismatched spin unit, the OR gate 56 outputs HIGH.

The AND gate 601 generates a logic AND of the output of the OR gate 56 and the output of the memory cell M. That is, in a case where the self spin unit is a mismatched spin unit and at least one of the adjacent spin units is a mismatched spin unit and there is a non-zero interaction, the AND gate 601 outputs HIGH, and the result is written to the memory cell M.

Figure 9A:
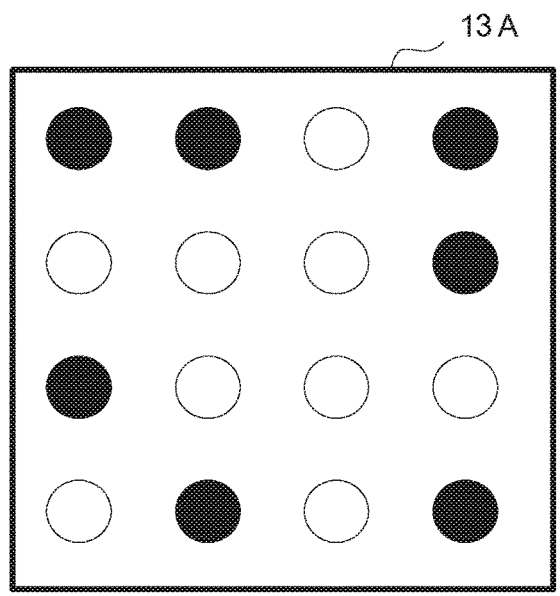
FIG. 9A is a schematic diagram illustrating a concept of processing of Example.
Figure 9A:
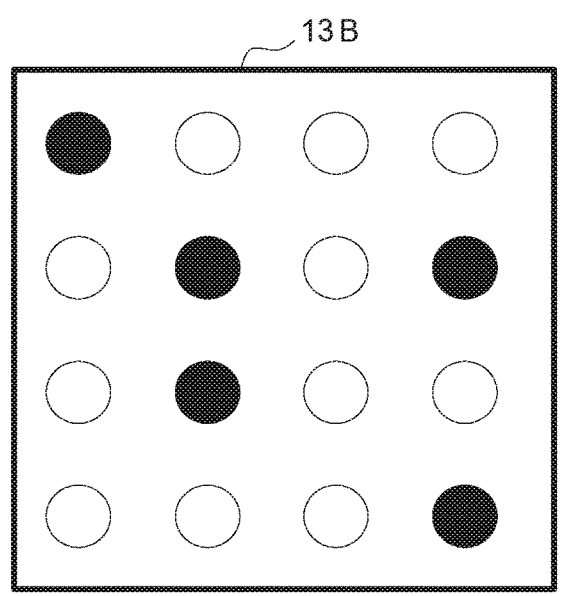
Figure 9B:
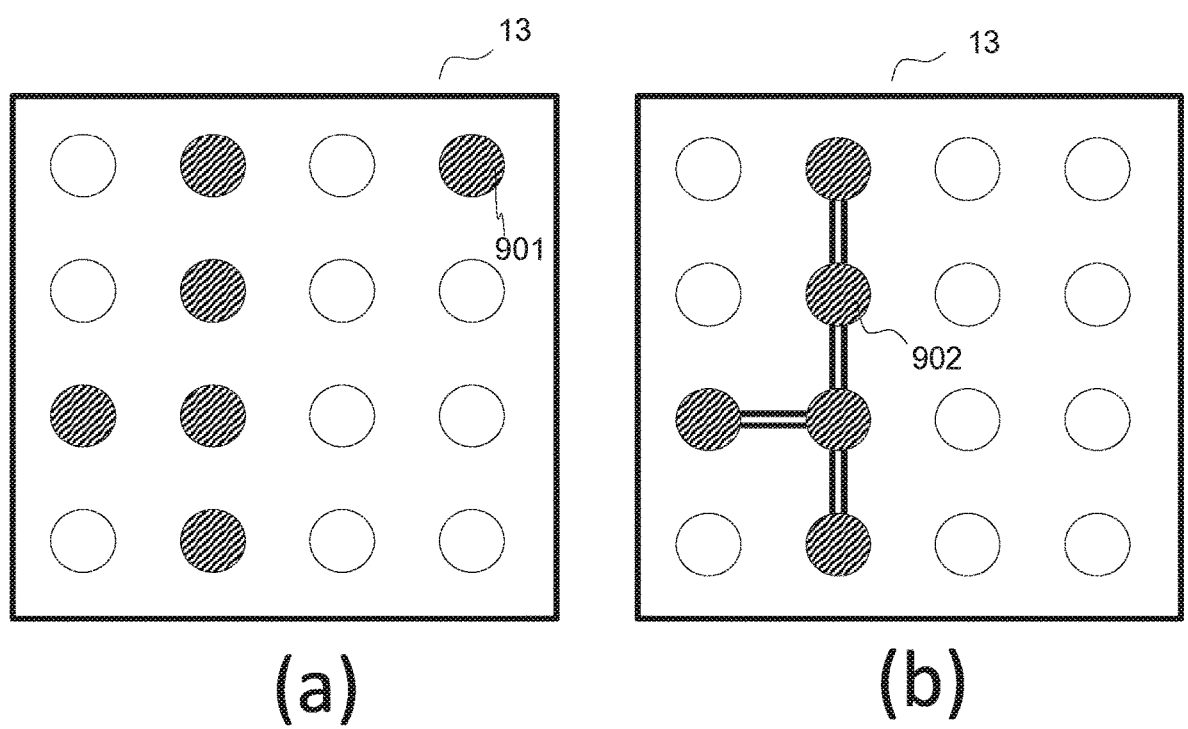
FIG. 9B is a schematic diagram illustrating a concept of processing of Example.

The meaning of the above processing will be described with reference to FIGS. 9A and 9B. FIG. 9A schematically illustrates the value of the spin of the Ising chip 13A of one set as (a) and the value of the spin of the spin unit of 13B of one set as (b). White and black circles indicate spin-up and spin-down, respectively. Each spin unit is assumed to have interaction with four spin units on the top, bottom, right and left of the self spin unit. In the process of FIG. 8B, one set of the Ising chips 13A and 13B informs each other of the values of spins of the self Ising chips through the inter-chip wire 14 and writes HIGH to the memory cell M in a case where the value of the spin of the self Ising chip is different from that of the other Ising chip. FIG. 9B(a) illustrates a state of the spin unit in which HIGH is written in the memory cell M by circled hatched lines.

Next, in the process of FIGS. 8C and 8D, HIGH is written in the memory cell M, and HIGH is written in the memory cell M of the adjacent spin unit. In addition, in a case where the interaction coefficient with the adjacent spin unit is not zero, the content of the memory cell M is maintained at HIGH.

In FIG. 9B(b), the state of the spin unit in which HIGH is maintained in the memory cell M is indicated by hatched circles, and the non-zero interaction is indicated by double lines. That is, it is possible to extract the spin unit 902 which is a cluster (group) except for the spin unit 901 that is a mismatched spin unit but an isolated spin unit.

This cluster may be considered to be a collection of mismatched spin unit which have other spins influencing a change of spin state of itself in interaction calculation and in which the other spins are also mismatched spin units.

The above is an example of a clustering method. In addition to the above, it is possible to appropriately set the same clustering conditions as those of a case where the self spin unit is a mismatched spin unit, at least two (or any number) of adjacent spin units are mismatched spin units, and there is an interaction that is not zero.

Figure 8F:
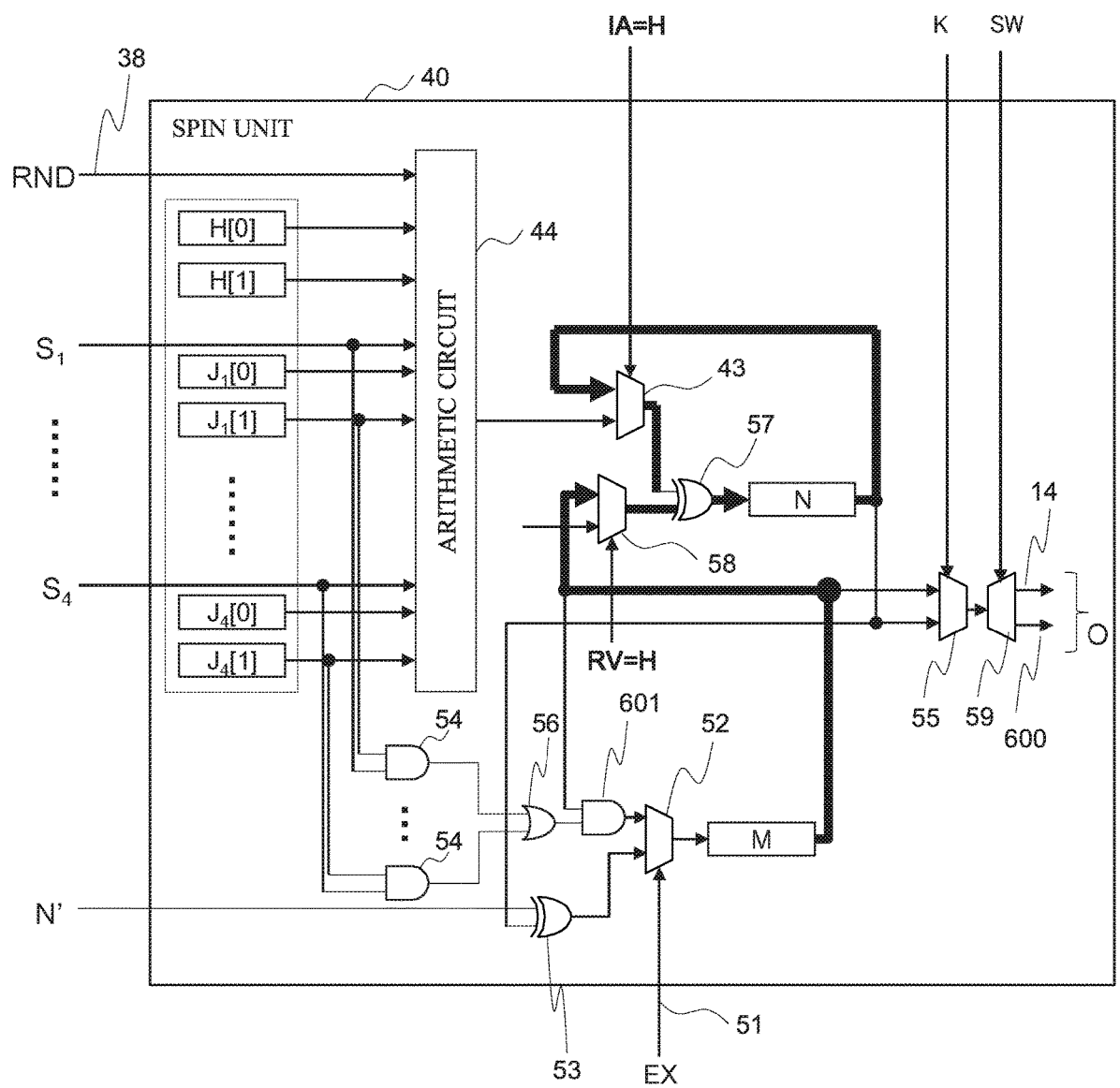
FIG. 8F is a circuit diagram illustrating an example of an operation state of a spin unit during processing.

After clustered, state exchanging is performed (process S733). Herein, the signal RV is set to HIGH. At this time, the selector 58 outputs a signal from the memory cell M. Then, the XOR gate 57 outputs the logic XOR of the value of the memory cell M and the value of the memory cell N and writes the value of logic XOR to the memory cell N (FIG. 8F). As a result, in a case where the value of the memory cell M is HIGH, the value of the memory cell N is inverted; and in a case where the value of the memory cell M is LOW, the value of the memory cell N does not change. This operation corresponds to inverting the value of the spin unit indicated by hatching in FIG. 9B(b) and corresponds to cluster exchanging in the cluster exchanging Monte Carlo method.

The above processing becomes one unit, and basically parallel processing is performed on all the spin units. By this process, by extracting regions with values of the spins different from those of other Ising chips and collectively inverting the spins, it is possible to simultaneously change the values of a plurality of spins only by the process within the Ising chip and to efficiently search for the basis state. By repeating the above-described process, it is possible to realize the cluster exchanging Monte Carlo method.

The interaction calculation is ended when a predetermined searching completion condition is achieved (process S715).

<(4) Control Procedure of Ising Chip>

Figure 10:
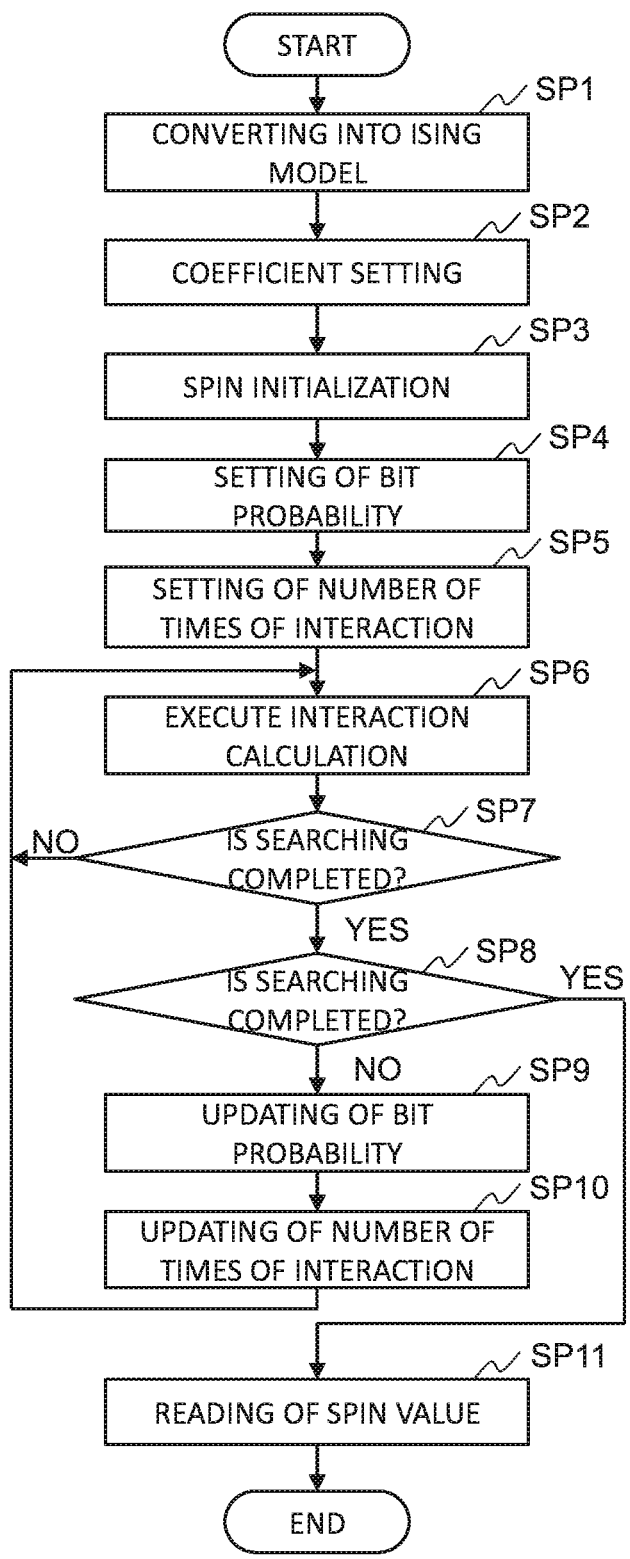
FIG. 10 is a flowchart illustrating a processing procedure of MCMC.

The control procedure of the Ising chip will be described. FIG. 10 is a flowchart illustrating the processing procedure of the MCMC in this embodiment.

FIG. 10 illustrates the processing procedure of a basis state searching process executed by the CPU 3 (FIG. 1) in the information processing apparatus 1 according to this embodiment. This process mainly corresponds to the spin updating process S710 by the interaction calculation in FIG. 7.

The CPU 3 processes step SP1 based on a problem conversion program (not illustrated). In the subsequent processes (step SP2 to step SP11), by controlling the Ising chip 13 within the multi-Ising chip 6 by using the controller 15 (FIG. 2) of the necessary multi-Ising chip 6 (FIG. 2) based on the multi-Ising chip control program 9 (FIG. 1), the Ising chip 13 is allowed to perform the basis state searching. In addition, the process of step SP1 and the processes of step SP2 to step SP11 may be executed at different timings.

In addition, the CPU 3 controls the Ising chip 13 in each multi-Ising chip 6 and the spin unit 40 in the Ising chip 13 by using the controller 15 (FIG. 2) within the multi-Ising chip 6, but hereinafter, for the better understanding, the presence of the controller 15 will be omitted in the description.

Upon starting this basis state searching process by an instruction or the like from the user, first, the CPU 3 converts the problem data 7 (FIG. 1) into data in the Ising model format (step SP1). In a case where the problem data 7 is already data in the Ising model format, step SP1 is omitted.

Subsequently, the CPU 3 sets the interaction coefficient and the external magnetic field coefficient of the Ising model after conversion for each spin unit 40 in each Ising chip 13 of the required multi-Ising chip 6 (step SP2).

Next, an initial spin arrangement is generated to initialize the spin. In this embodiment, all of the numerical values may be the same value, but typically, the initial value of the spin is set to a random value. Based on a memory map, coefficients and the initial spin arrangement are written to the spin array (step SP3).

The bit probability is set based on the model (step SP4), and the number of times of interaction is set (step SP5). The interaction calculation is executed (step SP6), and it is determined whether or not the execution is completed for all the spin arrays (step SP7). If not completed, the interaction calculation is executed for the next spin array (step SP6). If the execution is completed for all the spin arrays, it is determined whether or not the specified number of times of interaction is executed (step SP8). If not completed, the bit probability is updated (step SP9), the number of times of interaction is incremented (step SP10), and the interaction calculation is continued.

As illustrated in FIG. 7, during the spin updating by the interaction calculation, a cluster exchanging process is inserted as appropriate. The number of times of insertion is one or more. The timing of insertion may be determined simultaneously in setting the number of times of interaction (step SP5).

The updating of the bit probability is performed by adjusting the random number RND. In this embodiment, the random number generator 8 is used to invert the value of the spin with a predetermined probability. In the updating, the value of the spin is adjusted, for example, so that the value of the spin is inverted with a probability determined by a virtual temperature T, the value of the spin is inverted with a high probability at the initial stage of the basis state searching, and the value of the spin is inverted with a low probability at the final stage. By doing so, it is possible to imitate the physical annealing that is gradually cooling down from a high temperature in the course of the basis state searching process.

If the specified number of times of interaction has already been executed, the value of the spin is read (step SP11). Thereafter, the CPU 3 ends the basis state searching process. In this manner, the MCMC can be executed.

In this embodiment, each Ising chip 13 performs the basis state searching of the same model, and thus, common settings are maintained from the coefficient setting (step SP2) to the setting of the number of times of interaction (step SP5). However, in the interaction calculation after step SP6, each spin unit leads probabilistically different results by the random number RND.

<(5) Effect of Embodiment>

According to a semiconductor device and an information processing apparatus of this embodiment described above, it is possible to manufacture the semiconductor device and the information processing apparatus easily and inexpensively, and it is possible to calculate an arbitrary interaction model such as an Ising model. That is, in the information processing apparatus according to this embodiment, instead of sequentially updating a single variable, it is possible to execute MCMC while simultaneously updating a plurality of variables. Thus, it is possible to inexpensively and easily manufacture the information processing apparatus for accurately obtaining the basis state of the Ising model, an approximate solution of the basis state, or sampling with a high accuracy. More specifically, the details thereof are as follows.

According to this embodiment, in the case of realizing the MCMC for an interaction model typified by the Ising model, it is possible to realize state transition required for efficient state searching at a high speed while suppressing data transfer. That is, the load of transmitting information to an externally connected computer can be reduced, and calculation can be performed at a high speed on an arbitrary interaction network such as the Ising model. According to this embodiment, hardware for speeding up the MCMC can be realized by changing the spin arrangement to a large extent while satisfying the conditions for realizing appropriate sampling.

Although the invention made by the present inventor is described in detail based on embodiments, the present invention is not limited to the above-mentioned embodiments, and various modifications can be made without departing from the spirit of the present invention.

For example, the above-described embodiments have been described in detail for the better understanding of the present invention, and thus, the present invention is not necessarily limited to ones having all the configurations described. For example, it is possible to replace a portion of the configuration of one embodiment with the configuration of another embodiment, and the configuration of another embodiment can be added to the configuration of one embodiment. In addition, it is possible to add, delete, or replace the configuration of another embodiment with respect to a portion of the configuration of each embodiment.

REFERENCE SIGNS LIST

1: information processing apparatus
2: system bus
3: CPU
4: memory
5: storage device
6: multi-Ising chip
7: problem data
8: random number generator
9: multi-Ising chip control program
11: Ising chip group
12: control unit
13: Ising chip
14: inter-chip wire
15: controller
16: interaction clock generator
20: spin array
24: inter-chip connector
40: spin unit
44: arithmetic circuit
38: random number signal line

The invention claimed is:

1. An information processing apparatus comprising:
a first array circuit; and
a second array circuit,
wherein each of the first and second array circuits includes a plurality of units,
wherein each of the plurality of units includes:
a first memory cell that stores a value indicating a state of one node of an interaction model;
a second memory cell that stores an interaction coefficient indicating an interaction from a node of an adjacent unit connected to a self unit in the same array circuit as that of the self unit;
a third memory cell that stores a flag for controlling the value of the first memory cell;
a first logic circuit that determines a value indicating a next state of the one node based on a value indicating a state of the node of the adjacent unit and the interaction coefficient; and
a second logic circuit that changes the value of the first memory cell according to a value of the flag,
wherein each of the plurality of units includes an inter-array wire for transmitting the content of the first memory cell of the self unit to a corresponding unit of another array circuit and receiving the content of the first memory cell of the corresponding unit,
wherein the flag is generated based on information received through the inter-array wire,
wherein the second logic circuit includes a difference determination circuit that determines a difference between the content of the first memory cell of the self unit and the content of the first memory cell of the corresponding unit to obtain a result of the difference determination, and generates the flag by using the result of the difference determination; and
wherein the second logic circuit further includes:
a clustering circuit that determines the flag based on the result of the difference determination of the adjacent unit connected to the self unit in the same array circuit as that of the self unit, the interaction coefficient stored in the second memory cell, and the result of the difference determination of the self unit; and
a state exchanging circuit that changes the content of the first memory cell based on the determined flag.

2. The information processing apparatus according to claim 1,
wherein the clustering circuit generates the flag for changing the content of the first memory cell in a case where, among the adjacent units connected to the self unit, there is at least one adjacent unit of which the result of the difference determination indicates that values of contents of the at least one adjacent unit and the self unit are different and the interaction coefficient indicating the interaction from the node of the adjacent unit is non-zero.

3. The information processing apparatus according to claim 2,
wherein the content of the first memory cell is HIGH or LOW corresponding to a value of the spin, and
wherein the content of the first memory cell is inverted based on the flag.

4. The information processing apparatus according to claim 1,
wherein the first logic circuit is operated for a plurality of cycles, and an operation of the second logic circuit is inserted at a predetermined timing between cycles of the operation.

5. An information processing apparatus comprising:
a plurality of Ising chips; and
a controller that controls the plurality of Ising chips,
wherein each of the plurality of Ising chips includes a plurality of units,
wherein each of the plurality of units retains a spin state,
wherein the controller instructs one set of Ising chips among the plurality of Ising chips to compare values of spin states of corresponding units, and wherein the controller instructs the one set of Ising chips to invert values of a portion of spins among spins having different values of spin states of the corresponding units in parallel; and further comprising:

a clustering circuit that determines a flag based on a result of the comparison of the values of the spin states of corresponding units; and a state exchanging circuit that changes the spin states of the one set of Ising chips to invert values of the portion of spins among spins having different values of spin states of the corresponding units in parallel based on the determined flag.

6. The information processing apparatus according to claim 5, wherein the controller instructs switching of a process timing between a first information process of updating the spin state by interaction calculation and a second information process of comparing and inverting the values of the spin states, and inserts the second information process between cycles of the first information process repeated in a predetermined cycle.

7. The information processing apparatus according to claim 6, wherein a portion of spins among the spins having different values of spin states of the corresponding units are spins pertaining to a case where there is another spin influencing a change of the spin state of the self unit in the first information process and the value of another spin is different from the value of the spin state of the corresponding unit.

* * * * *